(12) United States Patent
Natu

(10) Patent No.: US 7,512,778 B2
(45) Date of Patent: *Mar. 31, 2009

(54) METHOD FOR SHARING HOST PROCESSOR FOR NON-OPERATING SYSTEM USES BY GENERATING A FALSE REMOVE SIGNAL

(75) Inventor: Mahesh S. Natu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 512 days.

This patent is subject to a terminal disclaimer.

(21) Appl. No.: 11/210,431

(22) Filed: Aug. 23, 2005

(65) Prior Publication Data

US 2006/0015710 A1      Jan. 19, 2006

Related U.S. Application Data

(63) Continuation of application No. 09/746,200, filed on Dec. 26, 2000, now Pat. No. 6,954,851.

(51) Int. Cl.
*G06F 15/177* (2006.01)
(52) U.S. Cl. ............................ 713/2; 710/302; 713/1; 714/31
(58) Field of Classification Search ............... 710/302; 713/1, 2; 714/31
See application file for complete search history.

(56) References Cited

U.S. PATENT DOCUMENTS

| 6,247,109 B1 | 6/2001 | Kleinsorge et al. |
| 6,370,657 B1 | 4/2002 | Jansen et al. |
| 6,415,342 B1 | 7/2002 | Wahl et al. |
| 6,654,707 B2 | 11/2003 | Wynn et al. |

OTHER PUBLICATIONS

IBM Technical Disclosure Bulletin, Hardware/Software Interface for Turning On/Off Processors in an Multiprocessor Environment, vol. 37, issue No. 9, Sep. 1994, pp. 365-368.

*Primary Examiner*—Thomas Lee
*Assistant Examiner*—Albert Wang
(74) *Attorney, Agent, or Firm*—Trop, Pruner & Hu, P.C.

(57) ABSTRACT

A method for using an operating system device for non-operating system uses. A false event signal is generated to indicate that a device should be shut down. After this is accomplished, the device is used for a different purpose while the operating system thinks it is inoperative. Once the other use is completed, another false event signal is generated so that the device is activated again and returned to use in the operating system in normal fashion.

18 Claims, 2 Drawing Sheets

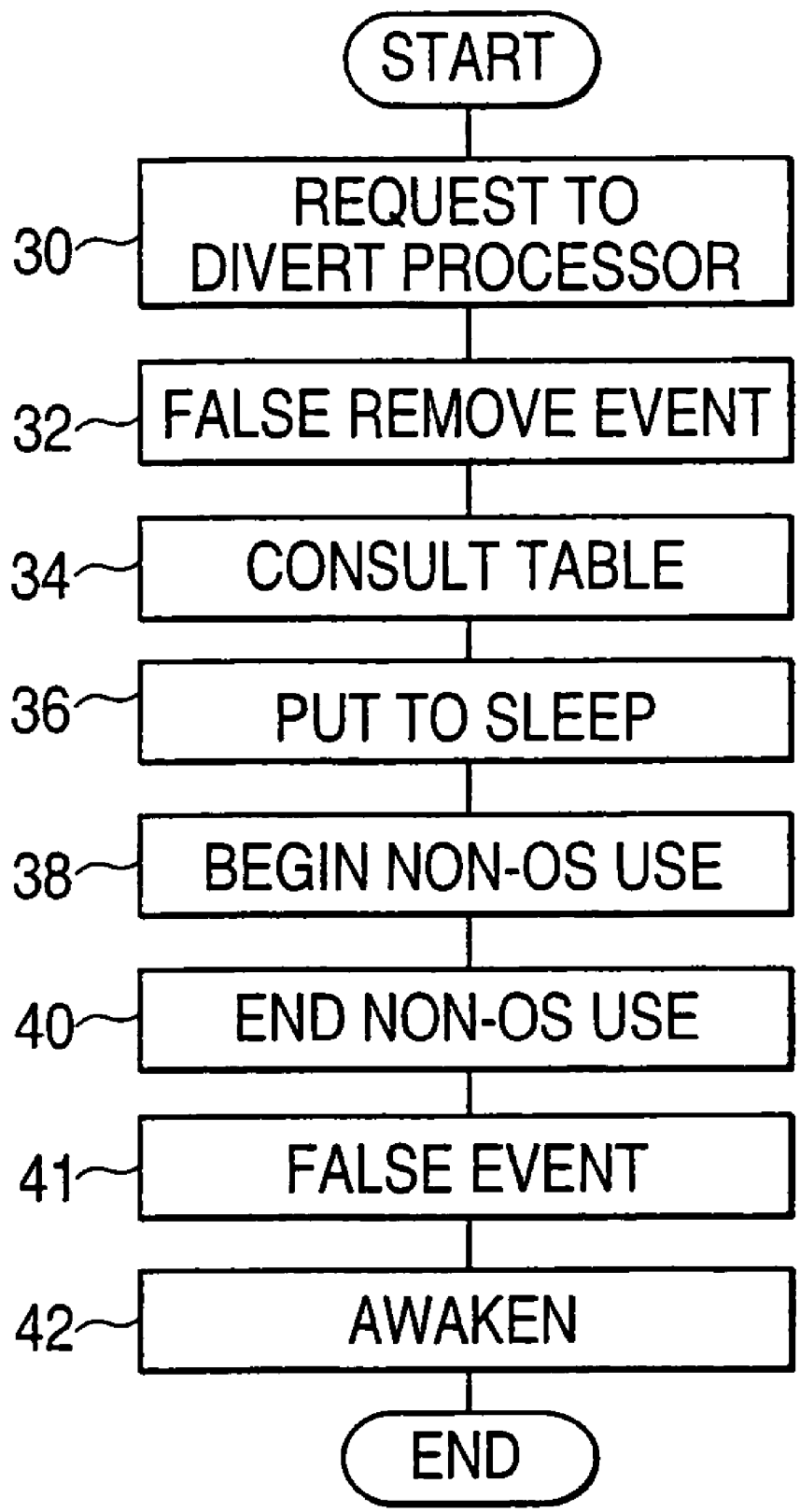

METHOD FOR SHARING HOST PROCESSOR FOR NON-OPERATING SYSTEM USES BY GENERATING A FALSE REMOVE SIGNAL

RELATED APPLICATION

Continuation of patent application Ser. No.: 09/746,200 filed Dec. 26, 2000 now U.S. Pat. No. 6,954,851.

FIELD

The present invention is directed to a method for using a host processor or other hardware for non-operating system uses. More particularly, the present invention is directed to a method for sharing a host processor or other hardware between operating system uses and non-operating system uses.

BACKGROUND

In the computer field, various server platforms have been developed for use in different types of systems. Such servers often include a plurality of processors which operate to perform specific tasks which the server is given. Such a system is shown in FIG. 1 where the server 10 includes a plurality of processors 12. The processors are connected to a bus to which additional processors or other equipment may be connected. Also connected to the bus is a controller 14 which runs the operating system and thereby controls the operation of the server itself. A memory 16 is also connected to the controller so that system data can be stored for access by the controller.

This server system will also have additional elements connected thereto. A peripheral component interconnect bus (PCI Local bus specification 2.2) 18 allows the controller to be connected to other peripheral components. Other devices may also be connected by way of similar buses to the controller.

Such server systems are now known and operate well in a number of different situations. However, it is always advantageous to find better methods for running such a system. Such improvements can relate to areas such as speed, reliability and power usage. In the area of reducing power usage, a specification has been advanced which helps to manage the power use of such a server through the operating system. The specification which describes these ideas is called the advanced configuration and power interface (ACPI). One of the basic concepts of this specification is to move to the operating system the directed power management. This is different from the systems often used today where power management is only added onto some PC's. This inhibits application vendors from supporting or exporting it. By moving the power management functionality into the operating system, it becomes available on every machine that the operating system is installed on. While the level of power savings will vary, all users will have the power management functionality available.

Furthermore, by having the power management resident in the operating system, it avoids the necessity to work this system through the BIOS (Basic input/output system) structure. The BIOS code has become very complex in regard to power management. Accordingly, the use of the operating system to manage the power usage has great advantages.

In addition to managing the power usage, the ACPI specification provides a more dynamic system configuration. In particular, it is possible to remove or replace parts of the system without shutting down the system as a whole. Thus, various events may be signaled by the hardware to indicate changes such as a configuration change. A system control interrupt is then generated which is executed by the operating system. Once the device is shut down, it may be removed and replaced while the system continues to run. This is referred to as a hot remove event. That is, it is considered hot because the system continues to operate while it is replaced. This arrangement allows the system to be more flexible in its configuration.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 3 is an example flow chart of an advantageous embodiment of the present invention.

DETAILED DESCRIPTION

Figure 1:
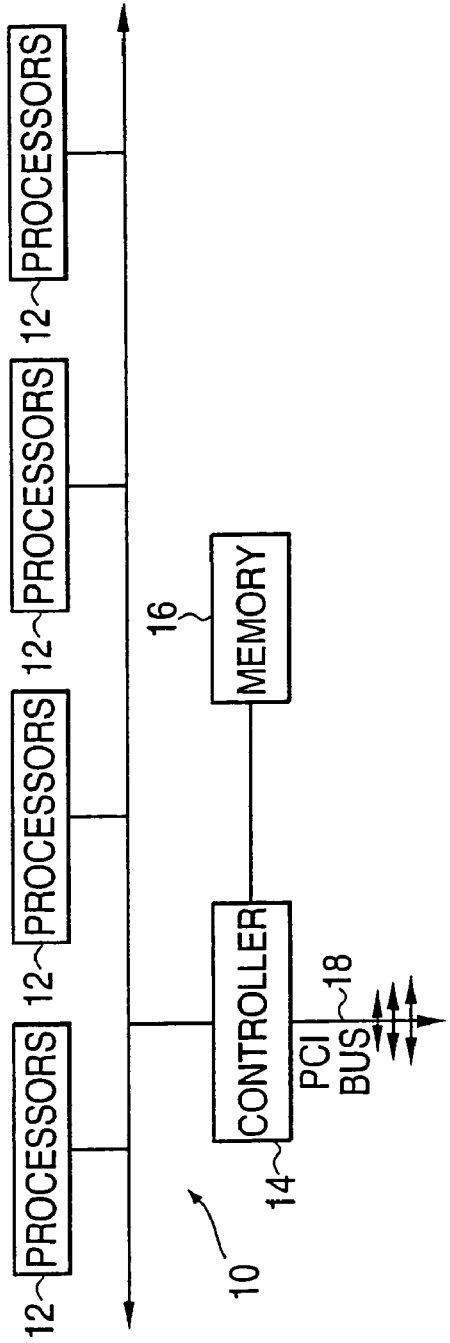
FIG. 1 is a block diagram of an example ACPI server system.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. As a final note, well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention will be described using an example system block diagram in an example personal computer (PC) environment, practice of the invention is not limited thereto, i.e., the invention may be able to be practiced with other types of systems, and in other types of environments (e.g., servers or any processor based system).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Although example embodiments of the present invention will be described using an example Peripheral Component Interface (PCI) bus in an example personal computer (PC) environment, practice of the invention is not limited thereto, i.e., the invention may be able to be practiced with other types of buses (e.g., PCI-extended (PCI-X) buses), and in other types of environments (e.g., servers).

Figure 2:
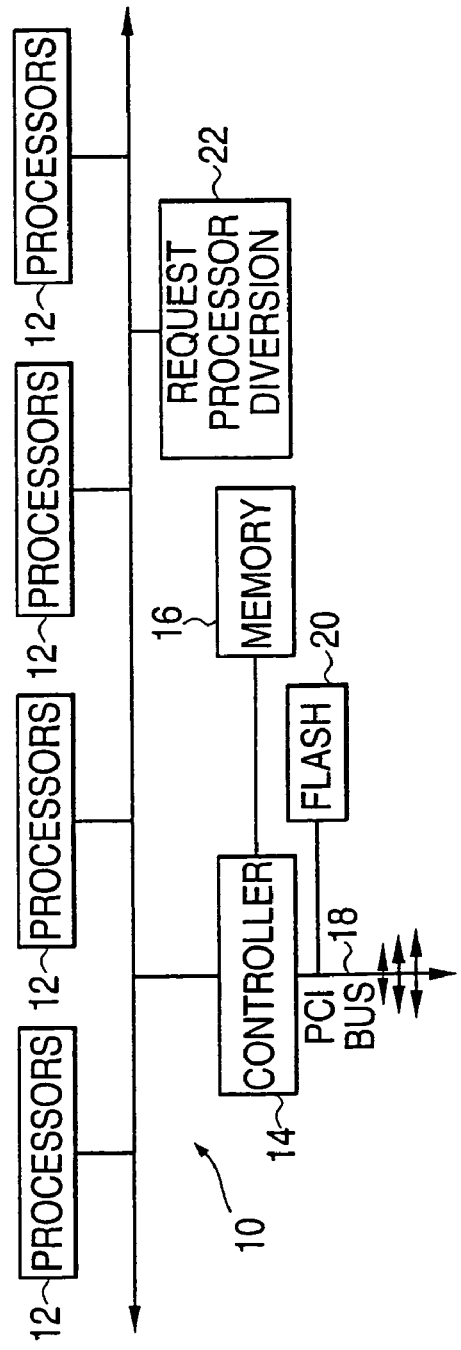
FIG. 2 is a block diagram of any advantageous embodiment of the present invention.

FIG. 2 shows an embodiment similar to FIG. 1, but using the present invention. As indicated above, when a server system is running, the processors 12 are used to perform various functions and are controlled by the controller and operating system. The hardware in the ACPI system indicates to the operating system when various events occur such as a configuration change or an improperly operating device. A system control interrupt (SCI) signal is generated when such an event occurs. The operating system refers to a table that describes what the particular event is. These tables are typically generated by the BIOS system which understands the platform hardware. The operating system questions these tables to interpret the event and to decide on an appropriate action.

In particular, the ACPI system allows a processor or other device to be inserted or removed without shutting down the system as a whole. When a signal is given either manually or through an internal indication by the system, the device may be shut down for replacement or a new device may be added. For example, if a diagnostic indicates that the particular device is not operating properly, the device is shut down into a sleep mode so that the device may be removed and replaced while the system remains operating. Thus, it is not necessary to shut down the system in order to add, remove or replace a device. Preferably, the device is removed by a VCR (video cassette recorder)-style ejection mechanism. In such a system, the eject button does not immediately remove the device but indicates to the operating system that it should be removed. The operating system shuts down the device, closes open files, unloads the driver and then sends a command to the hardware to eject the device.

It sometimes occurs that not all of the host processors are needed in order to perform the tasks of the operating system. Thus, the processors could be used for other tasks which are not controlled by the operating system so as to make more effective use of the processors. This has not been possible in the past. However, the present embodiment allows one or more processors or other devices to be taken away from the operating system and use it to perform platform specific, operating system independent tasks and then to return it to the operating system. This happens dynamically so that the system does not need to be re-booted. Thus, the operating system will not operate quite as well when the processor is off-line, but it is not forced into down time in the process.

As indicated above, the hardware normally indicates when a remove event has occurred for one of the processors or other devices which are part of the system. In order to utilize one of the processors for a different purpose, it is only necessary that the remove event signal be generated falsely to the operating system. This can be generated upon a request by other parts of the server or generated manually, as indicated by device 22. For example, a user may request a BIOS update manually, or the controller can regularly facilitate periodic operations such as memory testing. When the signal is sent, a system control interrupt will occur and the operating system will consult the tables to find the meaning of the event signal. Since the table indicates that a remove request has been received, the operating system will shut down all activity in that processor and transfer the load to other processors. Thus, the processor will be shut down in a fashion similar to a sleep state. Once this has occurred, the processor is free to be used for other purposes such as performing a BIOS update on flash 20, updating microcontroller firmware, executing diagnostics, performing background memory scrubbing, etc. Control of the processor is then given to the appropriate part of the server which has requested access. It would not normally be possible to do a BIOS update in an operating system environment because of security issues. However, the present embodiment permits a processor to be borrowed from the operating system while it is running and return the processor to the operating system. When the non-operating system use is concluded, another false event signal is generated to indicate that the processor has been replaced so that it is awakened and returned to operating system use.

Under previous systems, the operating system level driver could not enable writes to flash, because anyone could write code to corrupt the BIOS. It can only be performed by an entity that the BIOS can trust, when the operating system is in control, BIOS code cannot be run. However, the present approach permits a borrowing of the processor, a flash update and the return of the processor to the operating system. There is only a single limitation and that is that the processor cannot use resources that the operating system is using.

FIG. 3 shows the steps of the method in a flow chart. As seen there, in step 30 an indication is given that the processor or other device should be diverted. In step 32 a remove event is faked. In step 34, the table is consulted and the operating system learns that there is a remove request. In step 36 the processor is drained of all activity and put into a sleep state. In step 38 the processor is adopted by other systems. In step 40 the processor has finished working with the other systems. In step 41, another false event signal is generated. In step 42, the processor is awakened and reloaded with the data that was stored when it went to a sleep mode. The processor then is ready to return to normal operation.

The method described has been directed toward freeing up a processor for use by other parts of the server. However, it would also be possible to make parts of off-line hardware available, in a manner similar to the described off-line processor. Thus, for a PCI card it is possible to fake a remove event so that the operating system no longer uses that card. For example if a processor needs memory, a remove event can be used to make that memory available to the off-line processor. When the section of memory is isolated like this, it can be thoroughly tested to locate any possible problems. Thus, it would be possible to run such tests once a month without any significant downtime. The card can be returned to the operating system once this procedure is finished by faking an add event to the operating system in a similar fashion.

While it would be possible to utilize the controller that handles the system management as a processor, it typically runs at a much slower speed than the host processors and thus is not as useful. While it could be replaced with a faster controller, the cost would increase which is not desirable. Further, this controller does not have access to most of the hardware such as the memory, and therefore can only perform limited functions. Adding an additional processor is expensive and not necessary if the host processor can be utilized in two different manners.

Similarly, bringing the system down in order to perform the tasks described is not acceptable since downtime is normally avoided.

Another approach would be to write an operating system level driver to perform the work. Since servers have to support many operating systems, one has to develop the same code for all the supported operating system. As mentioned above, some of the activities like secure BIOS update cannot be performed under operating system control due to security issues. Thus, such a BIOS update can only be executed on processors that are not owned by the operating system.

Thus, the present system utilizes a function which was designed to limit power usage for a completely different purpose, namely to shut down part of the system so that it can be used by a different part of the system after it has shut down. This is accomplished by generating a false event signal so that the device is shut down by the operating system, thus fooling the system.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method for sharing a device in a computer system between operating system uses and non-operating system uses, comprising:
    generating a first false remove signal in regard to a device to indicate to the operating system that the device is to be removed from the computer system;
    placing said device in a sleep state via the operating system;
    not removing the device, and instead using said device for a non-operating system use; and
    generating a second false event signal in regard to the device to indicate to the operating system that the device has been replaced and returning the device to the operating system use.

2. The method according to claim 1, wherein the first false remove signal is generated in response to a request to divert the device.

3. The method according to claim 1, wherein
    the operating system consults tables upon receipt of the first false remove signal to determine the meaning of the signal and the device involved.

4. The method according to claim 1, wherein the device is used to perform a basic input/output system (BIOS) update as the non-operating system use.

5. The method according to claim 1, wherein data present in the device is stored in memory when the device is put in the sleep state and returned to the device when it is returned to the operating system use.

6. The method according to claim 5, further comprising awakening the device after the second false event signal is generated.

7. The method according to claim 1, wherein said device is a processor.

8. An apparatus for sharing a device between operating system uses and non-operating system uses, comprising:
    a plurality of devices;
    a controller connected to said devices through a bus;
    a memory connected to said controller;
    means to request access to a device for a non-operating system use;
    wherein said controller is to generate a false remove event in response to a request to divert the device to the non-operating system use, put the device to sleep and grant control of the device to the non-operating system use for a limited time and awaken the device after the non-operating system use is completed.

9. The apparatus according to claim 8, further comprising a peripheral component interface bus connected to said controller, to which other peripheral components can be connected.

10. The apparatus according to claim 8, further comprising means for generating a basic input/output system (BIOS) update.

11. The apparatus according to claim 10, wherein the means for generating is a flash update.

12. The apparatus according to claim 8, wherein said device is a processor.

13. A method comprising:
    using a plurality of devices coupled to a controller of a system to perform operating system tasks;
    generating a false remove signal concerning at least one of said plurality of devices to indicate to the operating system that the at least one device is to be removed from the system;
    ending activity in the device and transferring a load of the device to at least another of the plurality of devices via the operating system;
    thereafter using said device for a non-operating system use; and
    generating a second false event signal in regard to the device to indicate to the operating system that the device has been replaced after said non-operating system use ends.

14. The method according to claim 13, wherein said non-operating system use is a basic input/output system (BIOS) update.

15. The method according to claim 14, wherein the BIOS update comprises a flash update.

16. The method according to claim 13, wherein said false remove signal is generated in response to a request to divert a device.

17. The method according to claim 13, further comprising awakening the device in response to the second false event signal.

18. The method according to claim 13, wherein said device is a processor.

* * * * *